United States Patent [19]
Strunk

[11] Patent Number: 5,375,795
[45] Date of Patent: Dec. 27, 1994

[54] FIXED RESCUE BASKET FOR HELICOPTERS

[76] Inventor: Harry Strunk, 27 N. 28 St., Bldg. 13A-4, Las Vegas, Nev. 89101

[21] Appl. No.: 132,882
[22] Filed: Oct. 7, 1993
[51] Int. Cl.⁵ .............................................. B64C 1/08
[52] U.S. Cl. .............................. 244/118.5; 244/137.2; 440/83
[58] Field of Search ............... 244/137.1, 137.2, 118.1, 244/118.9, 17.17; 440/83, 80

[56] References Cited
U.S. PATENT DOCUMENTS 3,934,847  1/1976  Bentivegna ................... 244/137 P
4,188,000  2/1980  Dalziel ......................... 244/137.2
4,564,161  1/1986  Frye ............................. 244/137 P
4,588,148  5/1986  Krauchick ................... 244/137.2
4,627,821 12/1986  Bradley et al. ................. 441/83
5,020,742  6/1991  Haslim ......................... 244/137.2
5,086,998  2/1992  Pelas ............................ 244/137.2

Primary Examiner—Galen L. Barefoot
Attorney, Agent, or Firm—Rhodes & Ascolillo

[57] ABSTRACT

A rescue device for a helicopter, the rescue device, being removably attached to the helicopter and including a basket-like structure, the front portion of which extends beyond the forwardmost portion of the helicopter.

9 Claims, 5 Drawing Sheets

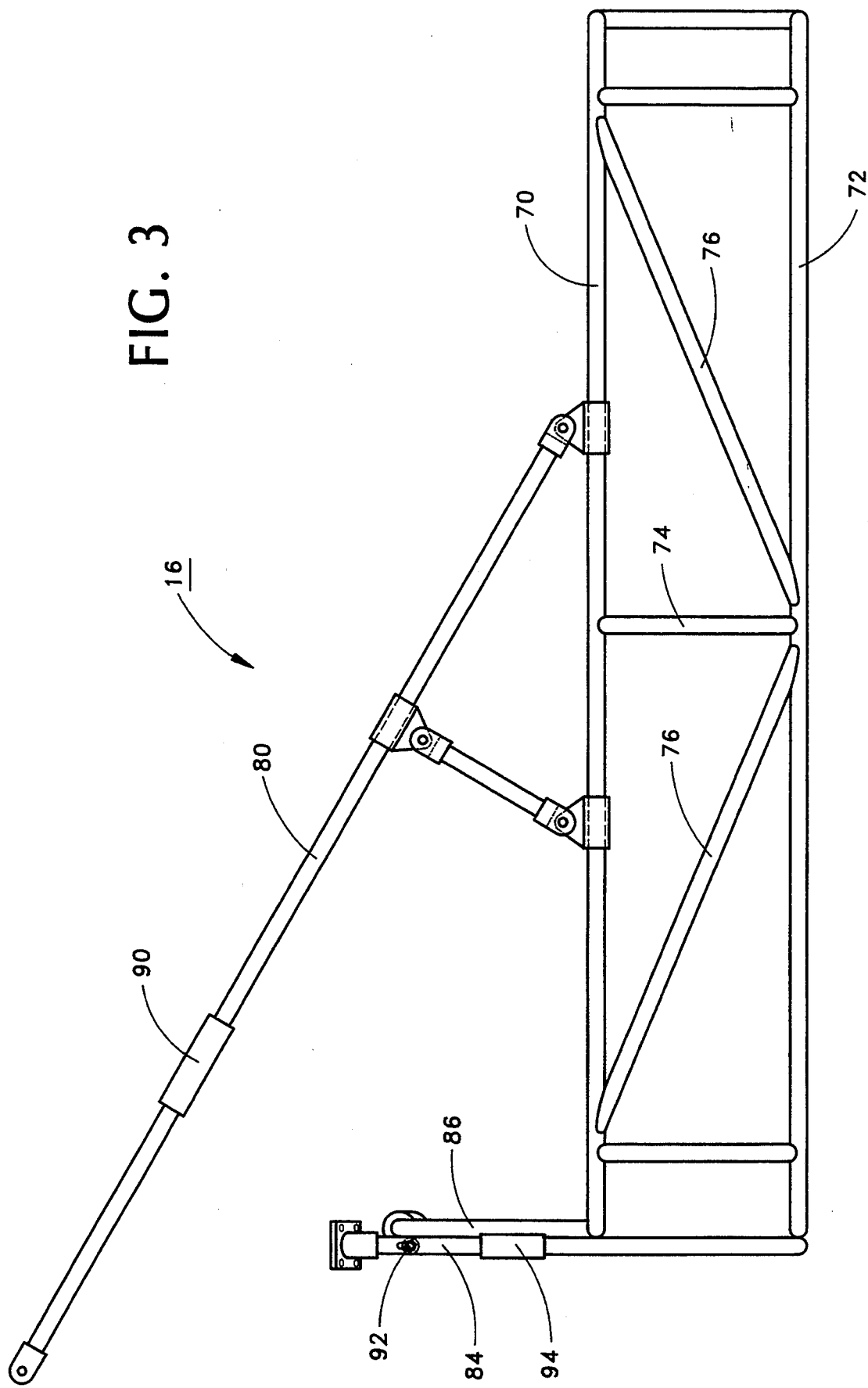

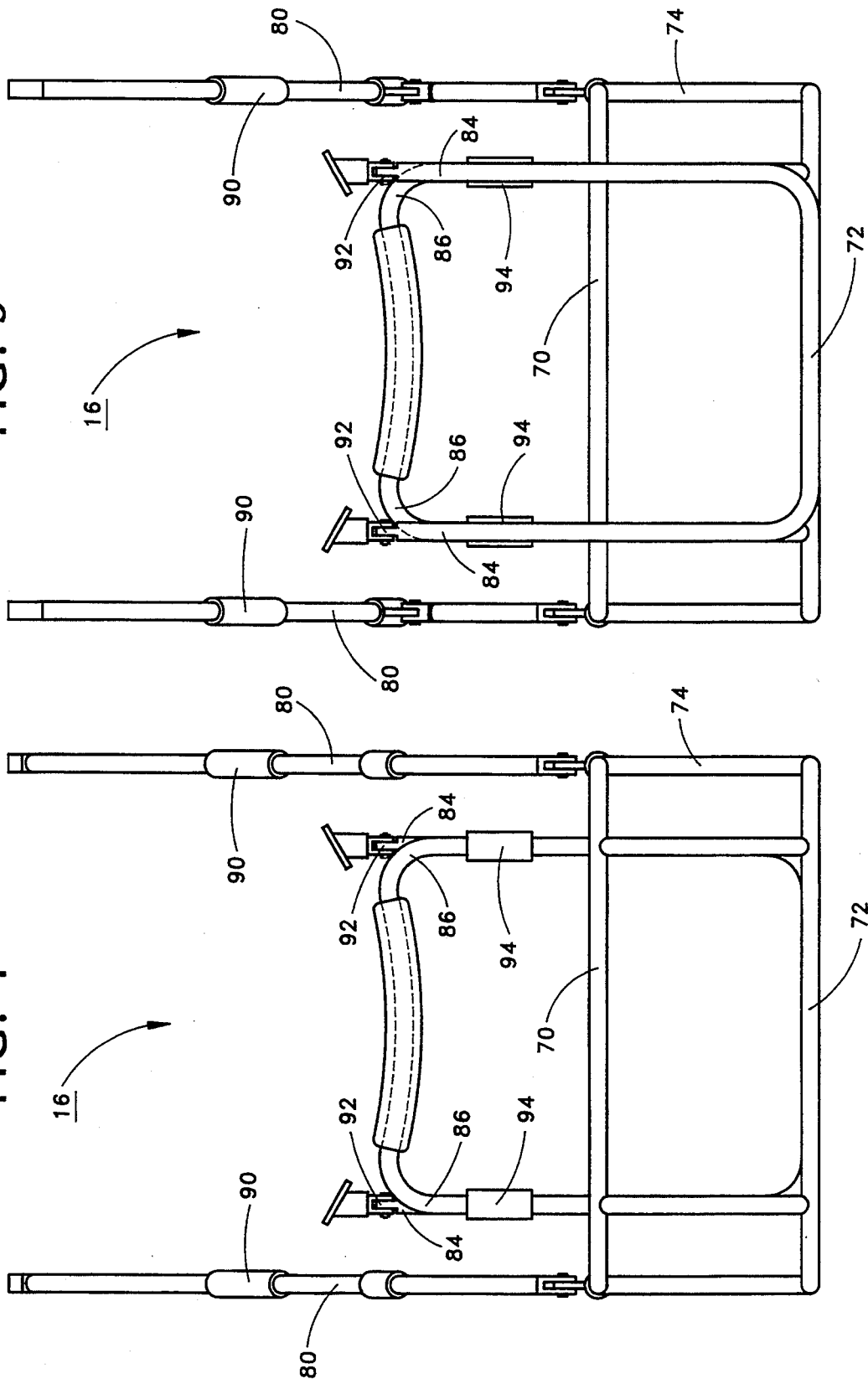

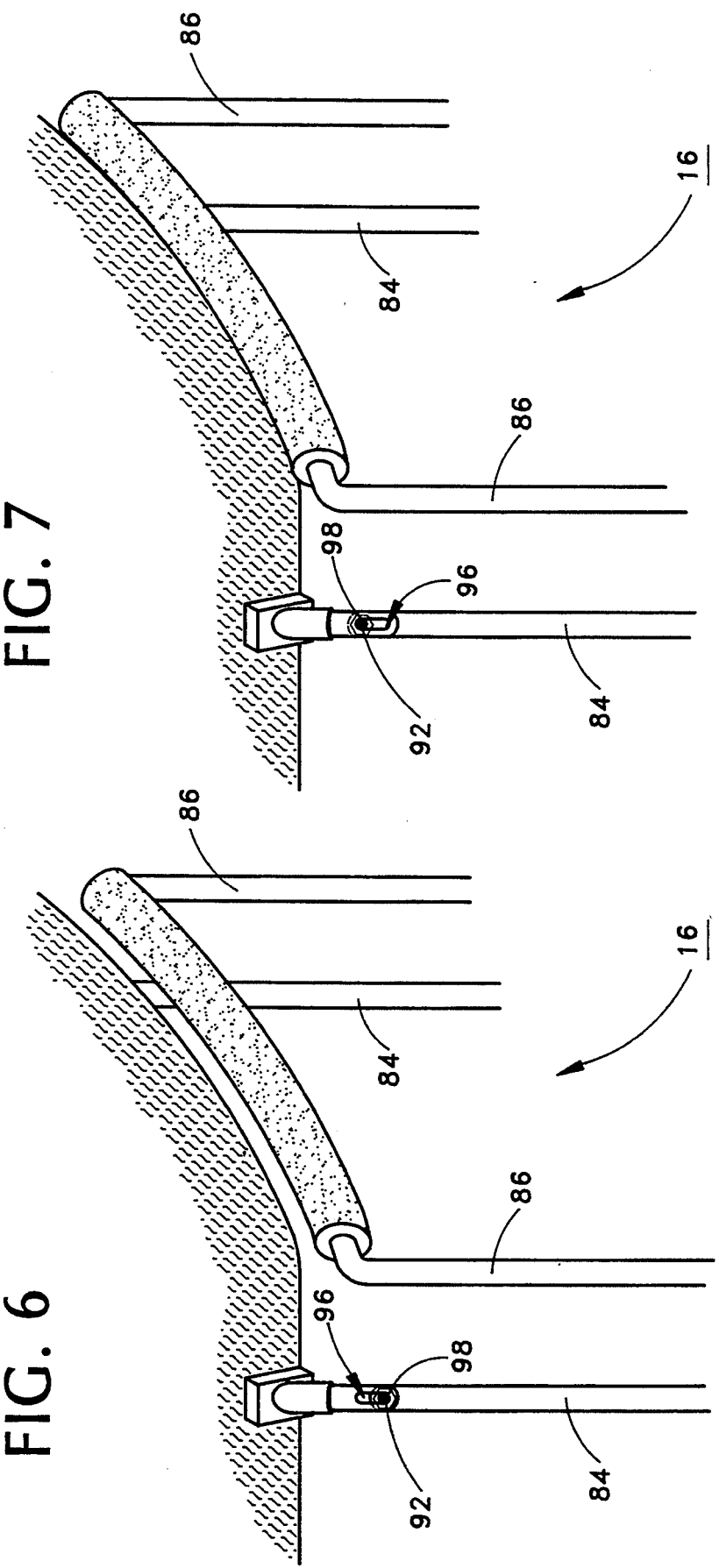

FIXED RESCUE BASKET FOR HELICOPTERS

BACKGROUND OF THE INVENTION

1. Field of the Invention

The present invention relates to rescue equipment generally and, more particularly, but not by way of limitation, to a novel rescue basket and method for helicopters which are especially useful in rescuing persons from burning buildings and in like situations.

2. Description of the Related Art

Helicopters have become extremely useful in rescuing and transferring persons trapped in life threatening situations or who need relocating for medical or other emergency reasons. There are literally thousands of circumstances that require the Army, Navy, Air Force, reserves, rangers, Coast Guard, fire and police departments, rescue squads, emergency medical and hospital groups, and others to use helicopters to fly to people and to evacuate them, especially when the people are in otherwise inaccessible situations. The ability of helicopters to hover over or near a rescue site is particularly useful in many rescue situations.

One difficult rescue situation is in the case of burning buildings. Often, the elevators and stairs in high rise buildings (or even shorter buildings) may be blocked, ladder trucks may not be able to reach windows, and/or people may be too high or unwilling to jump into a rescue net.

Commonly, in situations in which the helicopter cannot land, some sort of rescue mechanism is lowered vertically to the person or persons to be retrieved. This type of mechanism requires that the person to be rescued be directly underneath the helicopter and be able to attach or to enter the device, otherwise a trained rescuer must be lowered to assist the person.

A sling-type rescue device is described in U.S. Pat. No. 5,020,742, issued Jun. 4, 1991, to Haslim, the device being lowered vertically from a boom extending forwardly of a helicopter. Similarly, U.S. Pat. Nos. 4,564,161, issued Jan. 14, 1986, to Frye, and 4,627,821, issued Dec. 9, 1986, to Bradley et al., describe basket-type devices that are lowered vertically to a person or persons to be rescued.

None of the devices described in the foregoing patents is suitable for rescuing persons from windows of burning buildings. Because there is no direct force pressing the basket against the side of the building, positioning a basket of one of these devices next to a window so that persons can enter the basket is difficult. One approach to this specific situation is described in U.S. Pat. No. 3,934,847, issued Jan. 27, 1976, to Bentivegna, which describes a rescue capsule which is lowered vertically from the fuselage of a helicopter on flexible cables. The capsule includes a gangplank-type bridge extending from the distal end thereof. The capsule is lowered to the vicinity of a window of a burning building, the bridge is lowered against the building, and persons in the building cross the bridge to the capsule. This technique suffers the same disadvantage as those described in the foregoing patents, in that there is no direct force pressing the bridge against the building, making the use of such a device extremely hazardous.

Accordingly, it is a principal object of the present invention to provide an apparatus and a method which are especially useful in rescuing persons from buildings or from other surfaces which have vertical dimensional components, such apparatus and method being relatively safe.

It is an additional object of the invention to provide such apparatus which is economical to construct.

It is a further object of the invention to provide such apparatus and method which provide a positive force against the side of a building from which persons are to be rescued.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a rescue device for a helicopter, the rescue device comprising a basket-like structure, removably attached to the helicopter, having a frame whose front portion extends beyond a forwardmost portion of the helicopter, said frame being suspended from the helicopter by at least two support posts and at least two inclined strut members.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 3 is a side elevational view of the frame of the basket of FIG. 1.

FIG. 4 is a front elevational view of the frame of the basket of FIG. 1.

FIG. 5 is a rear elevational view of the frame of the basket of FIG. 1.

FIG. 6 is a fragmentary perspective view of the frame of the basket of FIG. 1 when the basket is in an unloaded state.

FIG. 7 is a fragmentary perspective view of the frame of the basket of FIG. 1 when the basket is in a loaded state.

DETAILED DESCRIPTION OF THE PREFERRED EMBODIMENTS

Figure 1:
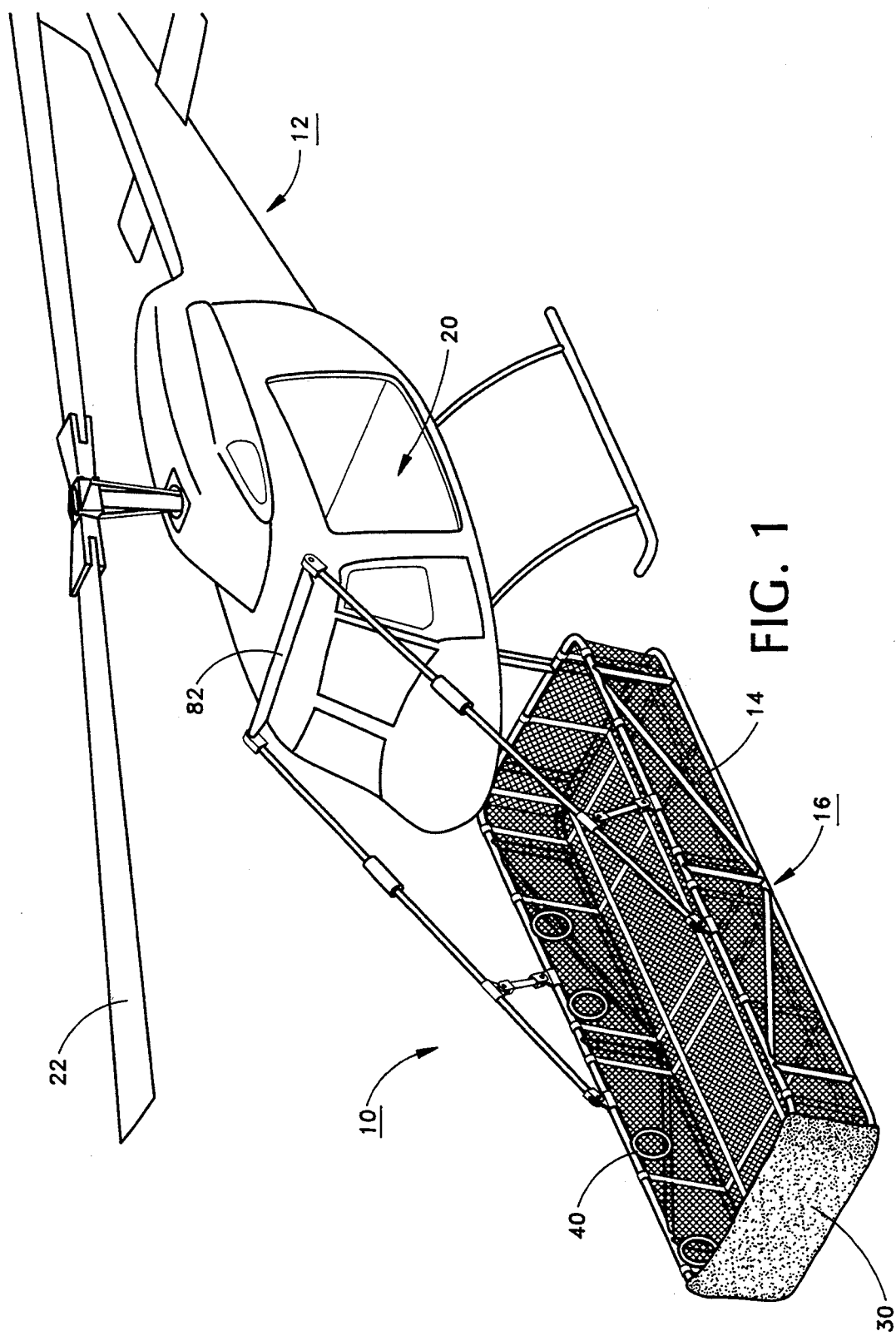
FIG. 1 is a top/front/port side perspective view of a helicopter with a fixed rescue basket according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

FIG. 1 illustrates a basket according to the present invention, generally indicated by the reference numeral 10, removedly attached to a conventional helicopter, generally indicated by the reference numeral 12. Basket 10 has an open top and is generally rectilinear, and has a mesh fabric 14, made from a suitable material such as metal or plastic, attached to a metal frame, generally indicated by the reference numeral 16, the frame being described in more detail below with reference to FIGS.

3-5. As illustrated in an alternate embodiment in FIG. 2, the rear end of basket 10 may extend rearwardly horizontally beneath doorway 20 of helicopter 12 so that persons in the basket 10 can be transferred to the helicopter 12 by a ladder or similar means (not shown) while the helicopter 12 is in flight. The front end of basket 10 extends sufficiently horizontally and forwardly of the bow of helicopter 12 to extend beyond the tips of main rotor 22 of the helicopter. The front face of basket 10 includes a thick asbestos padding 30 therearound. Mesh fabric 14 permits the air wash from the main rotor 22 to pass therethrough, thereby permitting adequate control of helicopter 12. As seen in FIG. 1, frame 16 includes a plurality of rings, as at 40, for the attachment thereof of safety lines (not shown) for persons in the basket (also not shown).

Figure 2:
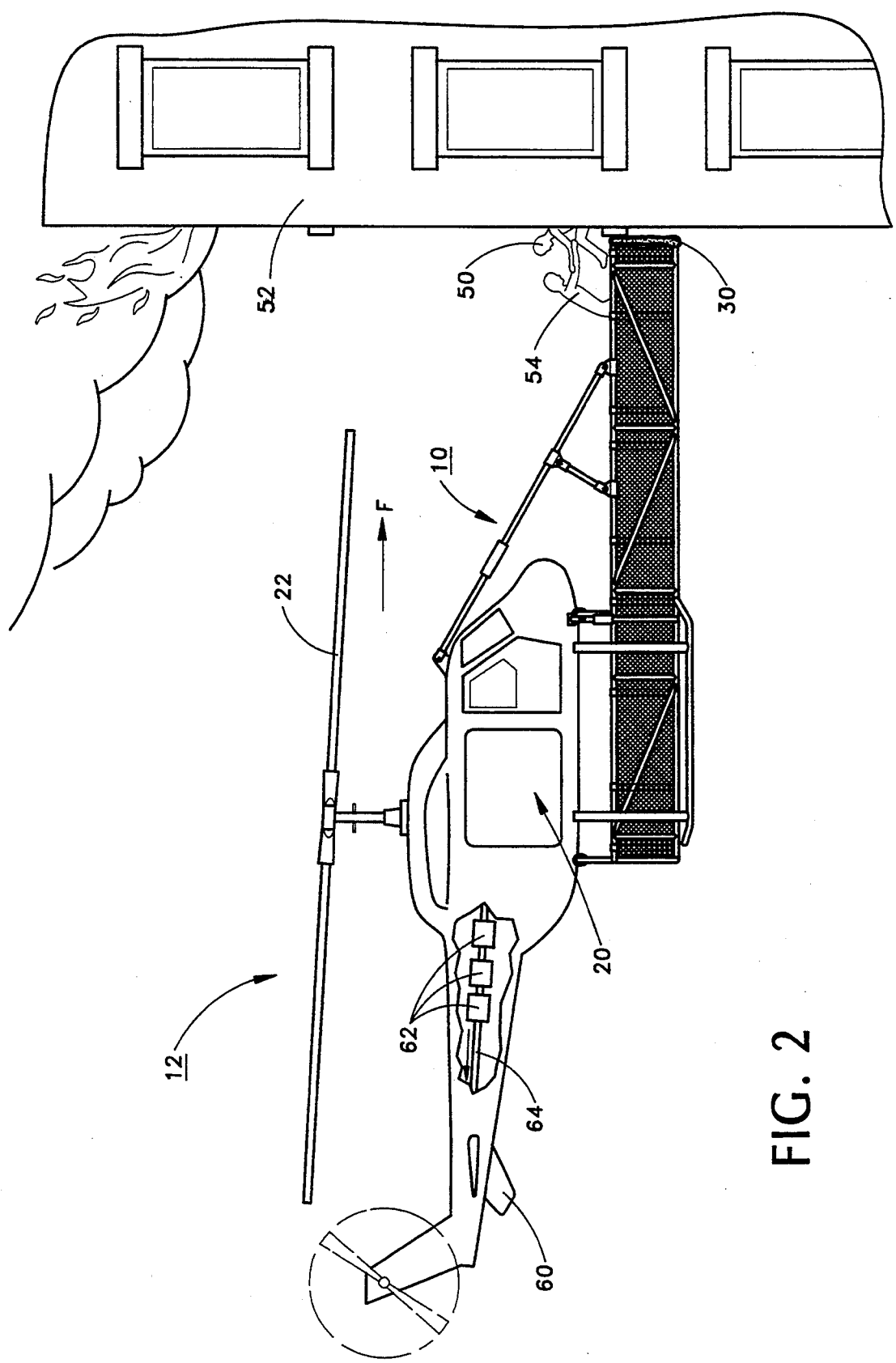
FIG. 2 is a side elevational view of the helicopter (partially cut-away) and rescue basket of FIG. 1 being used to rescue a person from a burning building.

FIG. 2 illustrates an alternate embodiment of basket 10 being employed to rescue a person 50 from a burning building 52. Here, helicopter 12 has approached building 52 at an elevation such that padding 30 on the front of basket 10 has engaged the building at the proper height so that person 50 can enter the basket, in this case, with the assistance of a rescuer 54 standing in the basket. The rescuee and/or rescuer can then proceed rearwardly to beneath the doorway 20 of helicopter 12 to facilitate entry into the helicopter.

An important aspect of the present invention is that, since basket 10 is removedly attached to helicopter 12, helicopter 12 can maintain a certain degree of forward force, as indicated by the arrow "F" in FIG. 2, to ensure that the front of the basket firmly and continuously engages the side of building 52. This method is not achievable by other rescue devices which are lowered on cables. Once all rescuees have entered the basket 10, helicopter 12 will back away from building 52 and leave the area.

Unless helicopter 12 is built for use with basket 10 of the present invention, it may be necessary to include one or more removably attached counterweights, such as counterweight 60, to the after part of the fuselage of the helicopter 12 to counterbalance the weight of the basket 10. Also depending on the helicopter employed, it may be necessary to include an adjustable counterweight mechanism comprising one or more movable counterweights 62 deployed on a track 64, which movable counterweights 62 can be repositioned on the track 64 as persons enter and/or leave basket 10. These counterweights 62 may be repositioned manually or by automatic means.

Reference should now be made to FIGS. 3-5 for an understanding of the construction of frame 16 of basket 10. Basket 10 includes a generally rectangular, horizontal, upper perimeter frame member 70 and a corresponding generally rectangular, horizontal lower perimeter frame member 72, the upper and lower frame members being fixedly joined by a plurality of vertical posts, as at 74. Diagonal cross members 76 fixedly attached between upper and lower frame members 70 and 72 provide additional rigidity to basket 10. Inclined strut assemblies 80 have their proximal ends removably attached to upper frame member 70 and their distal ends removably attached by an attachment mechanism to a flange 82 (FIG. 1) which is fixedly attached to the upper surface of the fuselage of helicopter 12. Fixedly disposed at the rear end of basket 10 are two vertical posts 84 the distal ends of which are removably attached to the lower surface of the fuselage of helicopter 12 as described below. A padded saddle member 86 may engage the lower surface of the fuselage of helicopter 12 when basket 10 is loaded, as seen in FIG. 7. The padded saddle member 86 may disengage the lower surface of the fuselage of helicopter 12 when basket 10 is unloaded, as seen in FIG. 6.

In order to permit basket 10 to engage the side of building 52 (FIG. 2) without transferring undue force to the fuselage of helicopter 12, shock absorbers 90 are disposed in inclined struts 80, shock absorbers 94 are disposed in vertical posts 84, and hinges 92 are disposed at the distal ends of vertical posts 84 as best seen in FIGS. 6 and 7.

A hinge 92 includes a slotted member 96 which is fixedly attached to the lower surface of the fuselage of helicopter 12. A hinge 92 also includes a pin member 98 which is fixedly attached to the distal end of a vertical post 84. Slotted member 96 releasably receives pin member 98, which may be threaded, and pin member 98 is removably attached to the slotted member 96 by a fastening mechanism such as the threaded nut shown in FIGS. 6 and 7. Hinges 92 are provided to permit a slight rotation of the basket when shock absorbers 90 are compressed. Hinges 92 also assist in the easy attachment and removal of basket 16 to and from helicopter 12. Slotted member 96 permits a degree of translational movement of vertical support posts 84. In addition, padded saddle member 86 absorbs shocks and distributes the weight of the loaded basket 10 over a relatively larger area of the lower surface of the fuselage of the helicopter 12, instead of transmitting all the load forces through hinges 92. Padding 30 (FIGS. 1 and 2) also cushions basket 10.

Frame 16 may be constructed of any suitable material and may be conveniently and economically constructed of tubular aluminum materials commonly used in the construction of airframes. Frame 16 may be covered and padded with a durable polymeric material for the added safety of persons in basket 10. Mesh fabric 14 will be selected so as to support the number of persons chosen for the design load of basket 10. Handrails and covers (neither shown) may be included for further safety, as well as wheels for rolling on the ground. In a further embodiment, basket 10 may be adapted to be dropped on water to act as a life raft.

Basket 10 may be employed in a similar manner, as above, to rescue persons from the sides of mountains, from burning ships, from the surface of water, or in other situations in which landing a helicopter 12 on a surface is not possible.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A rescue device for a helicopter, the rescue device comprising:
   (a) a basket-like structure, having a frame, the frame comprising:

a front portion extending beyond a forwardmost portion of the helicopter;
an opposing rear portion;
an upper perimeter frame member; and
a lower perimeter frame member;
(b) at least two inclined strut members, each inclined strut member having a proximal end attached to the frame and having distal end removably attached to an upper surface of the helicopter;
(c) at least two support posts, each support post having a proximal end fixedly attached to the frame and having a distal end releasably attached to a lower surface of the fuselage of the helicopter; and
(d) a saddle member, said saddle member comprising an inverted-U-shaped support fixedly attached to a rearwardmost end of the upper perimeter frame member to engage a lower surface of the helicopter.

2. A saddle member, as defined in claim 1, further comprising padding covering the saddle member.

3. A rescue device for a helicopter, the rescue device comprising:
(a) a basket-like structure, having a frame, the frame comprising:
a front portion extending beyond a forwardmost portion of the helicopter;
an opposing rear portion;
an upper perimeter frame member; and
a lower perimeter frame member;
(b) at least two inclined strut members, each inclined strut member having a proximal end attached to the frame and having a distal end removably attached to an upper surface of the helicopter;
(c) at least two support posts, each support post having a proximal end fixedly attached to the frame and having a distal end releasably attached to a lower surface of the fuselage of the helicopter; and
(d) at least one shock absorber disposed in each of said at least two inclined strut members.

4. A rescue device, as defined in claim 3, said rescue device further comprising at least one shock absorber disposed in each of said at least two support posts.

5. A rescue device for a helicopter, the rescue device comprising:
(a) a basket-like structure, having a frame, the frame comprising:
a front portion extending beyond a forwardmost portion of the helicopter;
an opposing rear portion;
an upper perimeter frame member; and
a lower perimeter frame member;
said basket-like structure further comprising:
a mesh fabric attached to the upper perimeter frame member,
said mesh fabric being attached to the upper perimeter frame member and to the lower perimeter frame member; and
at least one pad disposed on the front portion of said frame;
(b) at least two inclined strut members, each inclined strut member having a proximal end attached to the frame and having a distal end removably attached to an upper surface of the helicopter;
(c) at least two support posts, each support post having a proximal end fixedly attached to the frame and having a distal end releasably attached to a lower surface of the helicopter;
(d) a saddle member, said saddle member comprising an inverted-U-shaped support fixedly attached to a rearwardmost end of the upper perimeter frame member to engage a lower surface of the helicopter;
(e) a padding covering the saddle member;
(f) a hinge disposed at the distal end of each of said vertical support posts, said hinge comprising:
a pin member being fixedly attached to the distal end of each vertical support post;
a slotted member being fixedly attached to the lower surface of the fuselage of the helicopter, said slotted member releasably receiving said pin member; and
a fastening means for releasably connecting said pin member and said slotted member;
(g) at least one shock absorber disposed in each of said at least two inclined strut members;
(h) at least one shock absorber disposed in each of said at least two support posts; and
(i) a flange fixedly attached to the upper surface of the fuselage of the helicopter, said flange having a means for removably attaching said at least two inclined strut members to said helicopter.

6. A rescue device, as defined in claim 5, said rescue device further comprising a counterweight fixedly attached to the after part of the fuselage of the helicopter.

7. A rescue device, as defined in claim 5, said rescue device further comprising a an adjustable counterweight means, said adjustable counterweight means comprising:
(a) at least one movable counterweight; and
(b) a track upon which said at least one movable counterweight is positioned.

8. A basket-like structure, as defined in claim 5, wherein said opposing rear portion of said basket-like structure extends substantially under a doorway in said helicopter.

9. A basket-like structure, as defined in claim 5, said basket-like structure further comprising at least one ring disposed on an inner surface of the basket-like structure.

* * * * *